United States Patent [19]

Machado et al.

[11] 3,829,107

[45] Aug. 13, 1974

[54] PIPE JOINT

[75] Inventors: Mark A. Machado, Santa Rosa; James F. Forchini, Healdsburg, both of Calif.

[73] Assignee: Ecodyne Corporation, Chicago, Ill.

[22] Filed: Jan. 18, 1973

[21] Appl. No.: 315,044

[52] U.S. Cl............ 277/207, 277/DIG. 2, 285/230
[51] Int. Cl......................... F16j 15/00, F16k 41/00
[58] Field of Search ....... 277/207, 207 A, 208, 209, 277/DIG. 2; 285/230, 231, 345, DIG. 18

[56] References Cited
UNITED STATES PATENTS

| | | | |
|---|---|---|---|
| 2,809,853 | 10/1957 | Nathan | 277/207 A |
| 3,432,176 | 3/1969 | Valenziano | 277/207 A |

*Primary Examiner*—Louis R. Prince
*Assistant Examiner*—Robert I. Smith
*Attorney, Agent, or Firm*—Joel E. Siegel; Charles M. Kaplan

[57] ABSTRACT

A pipe joint including a first pipe having an enlarged hub portion and a second pipe having one of its ends telescopically received in the hub portion of the first pipe. A sealing gasket confined within a circumferential recess in the received end of the second pipe. The sealing gasket has a cross defining a plurality of radially extending labyrinth type fingers. A leading finger means formed integral with one of the labyrinth fingers, extends substantially axially outward from the gasket. The labyrinth fingers have an internal diameter greater than the internal diameter of the hub portion of the first pipe such that as the second pipe is received by the first pipe the labyrinth fingers are axially deformed causing a partial seal at each finger and rotation of the leading finger means towards a radial position so as to result in a double lip seal.

3 Claims, 2 Drawing Figures

3,829,107

PIPE JOINT

BACKGROUND AND SUMMARY OF THE INVENTION

This invention relates to an improved seal for pipe joints and more particularly to an improved flexible seal for the joint between the sections of large diameter fiberglass bell and spigot pipes.

The seal of this invention finds particular application for the connection of large diameter figerglass pipes of the type used in a water cooling tower distribution system. The seal is not, however, limited to such pipes nor to any particular size, but it will be apparent from the following description that the seal is particularly suitable for such piping in larger sizes wherein it provides a joint which can be adjusted laterally into position and can tolerate linear expansion resulting from temperature variations.

In the past, sealing rings or gaskets have generally been of the lip seal type or of the O-ring type. Conventional lip seals, of the type known in the art, have the advantage of being relatively flexible and thus allow for vertical and horizontal mis-alignment of the pipe sections, but in so doing have to sacrifice high static sealing capability. Conventional O-ring seals have the advantage of providing a high static sealing capability but in so doing sacrifice the flexibility required to compensate for wide joint design tolerances associated with large diameter pipe sections. The improved seal of the present invention provides a double lip seal in series with a plurality labyrinth seals in a manner which substantially attains the flexibility of a lip seal and the high static sealing capability of an O-ring.

It is a primary object of the present invention to provide an improved flexible seal which when positioned between the telescoped ends of two pipes, affords a pipe joint that is leak-proof and still is able to compensate for both vertical and horizontal mis-alignment of the pipes as well as joint design variances.

A further object of the present invention is to provide an improved seal which offers the static sealing capabilities of an O-ring seal while maintaining the flexible adjustment properties of a lip seal.

A still further object of the present invention is to provide an improved seal that offers expanded sealing capabilities to higher internal pressures with no increase in resistance during engagement.

Another object of the present invention is to provide an improved seal that provides an easy field installed flexible joint, with axial movement capabilities at no sacrifice in sealing capability.

The pipe joint of the present invention includes a first pipe having an enlarged hub portion at one of its ends and a second pipe having one of its ends telescopically received in the hub portion of the first pipe, said end having a circumferential recess for receiving and confining an annular sealing gasket. The sealing gasket has a cross section defining a plurality of radially extending labyrinth type fingers. A leading finger means formed integral with one of the labyrinth fingers, extends substantially axially outward from the gasket. The labyrinth fingers have an internal diameter greater than the internal diameter of the hub portion of the first pipe such that as the second pipe is received by the first pipe the labyrinth fingers are axially deformed causing a partial seal at each finger and rotation of the leading finger means towards a radial position so as to result in a double lip seal.

DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures and wherein.

DESCRIPTION OF THE PREFERRED EMBODIMENT

Figure 1:
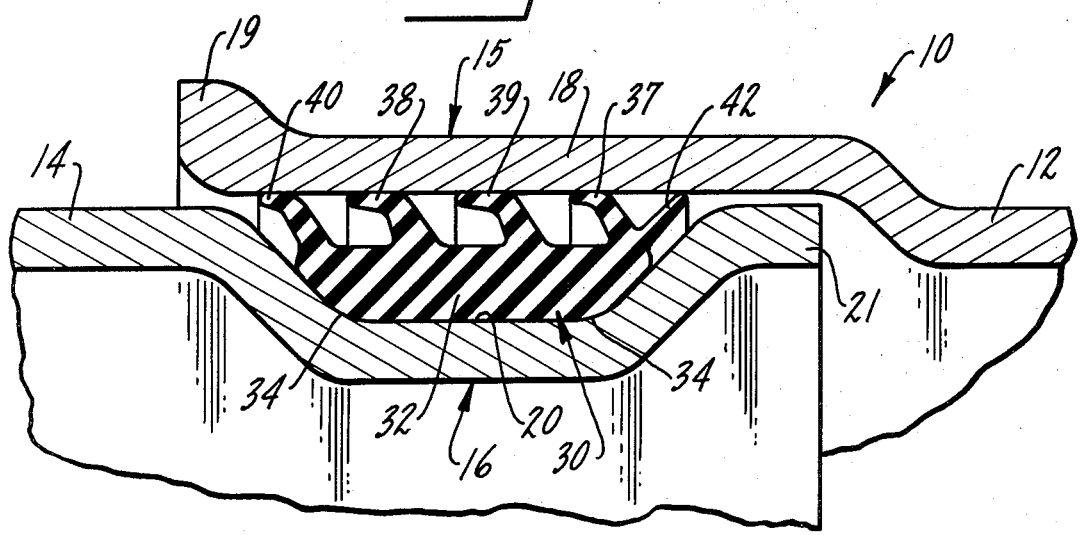
FIG. 1 shows in axial section, a pipe joint in accordance with the present invention.

Referring now to the drawings and more particularly to FIG. 1, an improved pipe joint of the present invention is shown generally at 10. This joint 10 is formed between the cylindrical pipes 12 and 14 by telescoping their end portions 15 and 16, respectively, together so that the end portion 15 of pipe 12 overlaps the end portions 16 of pipe 14. As is apparent from FIG. 1, the end portion 15 of pipe 12 has an enlarged hub portion 18 formed thereon that receives therein the end 16 of pipe 14. The inner diameter of hub 18 is slightly larger than the outer diameter of pipe 14. The leading edge of end portion 15 is beveled outwardly at 19 to facilitate the initial entry of end portion 16 therein. The end portion 16 of pipe 14 has the same diameter as the remainder of pipe 14 with the exception of an annular recess 20 formed therein close to the leading edge indicated at 21. Recess 20 provides a space between the end portion 16 of pipe 14 and the hub portion 18 of pipe 12 for the confinement of the improved annular sealing ring or gasket 30 of the present invention.

Figure 2:
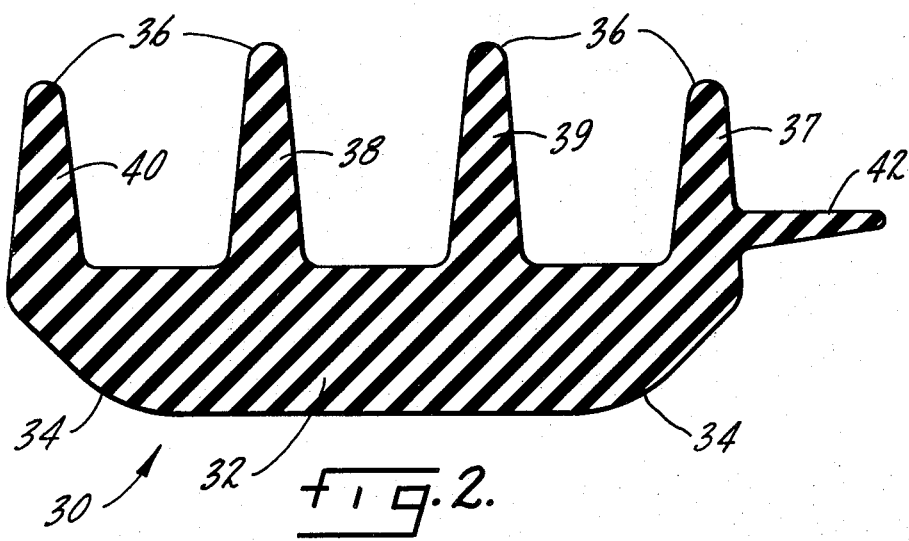
FIG. 2 is an enlarged transverse sectional view illustrating the improved gasket seal of the present invention in its unsealed form.

As seen in FIG. 2, the cross sectional shape of sealing gasket 30 may be generally described as a beveled bar having a flat bottom and an array of labyrinth fingers extending upwardly therefrom. Gasket 30 is formed with a generally rectangular base portion 32 with its inner corners rounded as indicated at 34. Extending radially outward from base portion 32, and formed integral therewith, are a series of labyrinth fingers 36. The preferred embodiment, as illustrated in FIGS. 1 and 2, includes an outer labyrinth finger 37, a pair of center labyrinth fingers 38 and 39, and an inner labyrinth finger 40. The length of fingers 38 and 39 are slightly greater than the length of finger 40 which in turn is slightly greater than the length of finger 37, for reasons which will hereinafter become more apparent. Formed integral with outer labyrinth finger 37, and extending axially outward therefrom, is a leading finger means 42 of substantially the same length as finger 37.

Gasket 30 is formed from a synthetic or natural rubber or similar material which is resiliently deformable. Gaskets 30 may be supplied as pre-formed rings sized to fit a particular diameter of pipe or they may be supplied in rolls of indeterminate length suitable for being cut into strips as required so that they may be applied to pipes and have their ends effectively cemented or fused or otherwise joined on the pipe surfaces.

A brief description of the assembly and operation of joint 10 follows to help describe the advantages of the present invention. Gasket 30 is initially positioned within recess 20 of pipe 14 with base portion 32 resting upon the external surface of recess 20. As seen in FIG. 1, rounded corners 34 conform to the inclined sides of recess 20. The internal diameter of gasket 30 is preferably slightly less than the outside diameter of the external surface of recess 20 and, therefore, gasket 30 must be stretched sufficiently to permit gasket 30 to be fitted over edge 21 and positioned in place within recess 20. With gasket 30 positioned within recess 20, the end portion 16 of pipe 14 is inserted into end portion 15 of pipe 12. As each labyrinth finger 36 contacts the inner surface of hub poriton 18 the outer portions thereof are axially deflected and form partial seals with respect thereto, as seen in FIG. 1. The deflection of finger 37 causes leading finger means 42 to deflect towards a radial position such that the outer portion thereof contacts and deforms about the inner surface of hub 18 and forms a double lip seal in conjunction with finger 37. End portion 16 is positioned within end portion 15 such that edge 21 is adjacent the inner end of hub portion 18. The sides of recess 20 are flared outward to receive corners 34 of gasket 30 and to provide room for a slight flow of gasket material when the gasket is compressed by the insertion of end portion 16 into hub portion 15. Fingers 37 and 40 are slightly shorter than fingers 38 and 39 to facilitate insertion of end portion 16 into hub portion 15.

The interference of each finger 36 with the inner surface of hub portion 18 results in a partial seal and a pressure drop results across each finger large enough to seal the internal pressure within the pipe. The total sealing capaicty of joint 10 is increased by the double lip seal, formed by the interference of leading finger means 42 with the inner surface of hub portion 18, which is in series with the labyrinth seal. This combined sealing effect offers expanded sealing capabilities with higher internal pressures at no increase in resistance during engagement. Joint 10 permits lateral adjustment, tolerates linear expansion, and can tolerate controlled amounts of parallel and axial mis-alignment. Further, there is no energy stored in joint 10 which would tend to move the pipes from their set position.

It will be seen that an improved pipe assembly has been provided including an improved gasket seal cooperating therewith in forming a sealed pipe joint. The improved pipe joint assembly is particularly useful for larger pipes such as fiberglass, ceramic or cement pipes, as it is easily assembled without requiring any special precautions or any particular skills. This adapts the joint for providing quickly-made and tight seals even where the size or weight of the pipe makes precision handling or alignment difficult or impossible and it also adapts the new joint assembly for use under widely varying field conditions.

It should be understood, of course, that the foregoing disclosure relates to only a preferred embodiment of the invention and that numerous modifications or alterations may be made therein without departing from the true spirit and the scope of the invention as set forth in the appended claims.

What is claimed is:

1. In a pipe joint comprising a first pipe having an enlarged hub portion at its end, and a second pipe telescopically received in the hub portion of the first pipe having a circumferential recess for receiving a sealing gasket; an improved flexible sealing gasket, comprising:

a. an annular base portion substantially filling and confined within said recess against axial movement in both directions, said base portion being of sufficient thickness to substantially retain its initial shape;
   b. a plurality of labyrinth type fingers formed integral with said base portion and extending radially outward a substantial distance therefrom; and
   c. leading finger means formed integral with one of said labyrinth type fingers and spaced from the free end of said labyrinth type fingers and extending axially outward beyond said base portion;
   d. said labyrinth type fingers having an external diameter greater than the internal diameter of said hub portion of said first pipe such that as said second pipe is received by said first pipe, said labyrinth fingers are axially deformed causing a partial seal at each finger and the rotation of said leading finger means towards a radial position so as to result in a double lip seal.

2. The invention as defined in claim 1 wherein said labyrinth type finger formed integral with said leading finger means being of slightly less length than the labyrinth type finger adjacent thereto so as to facilitate insertion of said second pipe into said hub portion of said first pipe.

3. The invention as defined in claim 2 wherein said sealing gasket is integrally formed from a resiliently deformable material.

* * * * *